United States Patent
Warren et al.

(10) Patent No.: US 10,641,596 B2
(45) Date of Patent: May 5, 2020

(54) SYSTEMS AND METHODS FOR PSEUDO-TRIAXIAL CAPACITANCE PROBE ASSEMBLIES

(71) Applicant: UNITED TECHNOLOGIES CORPORATION, Farmington, CT (US)

(72) Inventors: Eli Cole Warren, Wethersfield, CT (US); Edward F. Dreger, Burlington, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 143 days.

(21) Appl. No.: 16/012,632

(22) Filed: Jun. 19, 2018

(65) Prior Publication Data
US 2019/0383594 A1   Dec. 19, 2019

(51) Int. Cl.
*G01B 7/14* (2006.01)

(52) U.S. Cl.
CPC ...................................... *G01B 7/14* (2013.01)

(58) Field of Classification Search
CPC .......... G01B 7/14; G01B 5/0014; G01N 1/28; G01N 23/207; C30B 7/06; F04D 29/526; G01H 1/006
USPC .. 324/600, 200, 207.13, 220, 500, 523–533, 324/602–614, 667–683, 709
See application file for complete search history.

(56) References Cited

U.S. PATENT DOCUMENTS

| | | | |
|---|---|---|---|
| 5,101,165 | A | 3/1992 | Rickards |
| 5,119,036 | A | 6/1992 | Rickards et al. |
| 8,560,266 | B2 | 10/2013 | Zielinski |
| 9,316,479 | B2 | 4/2016 | Warren et al. |
| 9,341,462 | B2 | 5/2016 | Szedlacsek |
| 9,778,145 | B2 | 10/2017 | Walling |
| 2016/0139046 | A1* | 5/2016 | Baltz ..................... G01N 27/07 356/72 |
| 2019/0170011 | A1* | 6/2019 | Warren .................. F04D 29/526 |

FOREIGN PATENT DOCUMENTS

| | | |
|---|---|---|
| CN | 105588509 | 5/2016 |
| EP | 0246576 | 11/1987 |
| EP | 2669621 | 12/2013 |

OTHER PUBLICATIONS

European Patent Office, European Search Report dated Oct. 16, 2019 in Application No. 19181174.4.

* cited by examiner

*Primary Examiner* — Melissa J Koval
*Assistant Examiner* — Trung Nguyen
(74) *Attorney, Agent, or Firm* — Snell & Wilmer, L.L.P.

(57) ABSTRACT

A BTC probe may comprise a housing having a body, a neck extending radially from the body coupled to a hard lead comprising a hard shield, a driven guard, and a lead wire, and a cap coupled at a top surface of the body enclosing an interior volume of the housing. A sensor element may be disposed within the housing an coupled to the lead wire. The sensor element may comprise a sensor head having a first vertex.

10 Claims, 18 Drawing Sheets

SYSTEMS AND METHODS FOR PSEUDO-TRIAXIAL CAPACITANCE PROBE ASSEMBLIES

FIELD

The disclosure relates generally to fan, compressor, and turbine Blade Tip Clearance (BTC) and capacitance probe sensor assemblies in gas turbine engines.

BACKGROUND

Gas turbine engine efficiency is directly related to the level of control of the gap between a blade tip and a corresponding outer air seal. In various embodiments, a capacitance-based BTC probe (cap probe) may be placed proximate the outer air seal to monitor this gap. Traditional cap probes and cap probe installations tend to alter engine structures comprising the outer air seal, tending thereby to compromise the operation of the air seal and tending to reduce engine efficiency.

SUMMARY

In various embodiments the present disclosure provides a BTC probe, comprising a housing having a body, a neck extending radially from the body coupled to a hard lead comprising a hard shield, a driven guard, and a lead wire, and a cap coupled at a top surface of the body enclosing an interior volume of the housing, and a sensor element disposed within the housing and coupled to the lead wire, wherein the sensor element comprises a sensor head having a first vertex.

In various embodiments, the sensor head further comprises a second vertex and a third vertex, wherein each of the first vertex, the second vertex, and the third vertex are rounded. In various embodiments, each of the first vertex, the second vertex, and the third vertex comprise an interior angle defining a triangular head. In various embodiments, the triangular head is at least one of isosceles, equilateral, scalene, acute, obtuse, or right planform. In various embodiments, the first vertex, the second vertex, and the third vertex define at least one of a unilateral or bilateral curved head comprising at least one of a concave curve, a convex curve, or a compound curve. In various embodiments, the sensor head further comprises a fourth vertex defining a truncated bilateral curved head. In various embodiments, the sensor head further comprises a fourth vertex, each of the first vertex, the second vertex, the third vertex, and the fourth vertex having an interior angle defining a quadrilateral head. In various embodiments, the quadrilateral head is at least one of rectangular, square, rhomboidal, trapezoidal, or frustoconical planform. In various embodiments, the sensor head further comprises a fourth vertex, a fifth vertex, and a sixth vertex defining a cranked arrow head, wherein the fifth vertex and the sixth define an area of relatively increased or decreased X-Z slope along the perimeter of the cranked arrow head between each of their respective adjacent vertexes.

In various embodiments, the present disclosure provides a gas turbine engine comprising fan section having a fan case, a compressor section having a compressor case, a turbine section having a turbine case, and a blade tip clearance (BTC) probe, comprising a housing having a body, a neck extending radially from the body coupled to a hard lead comprising a hard shield, a driven guard, and a lead wire, and a cap coupled at a top surface of the body enclosing an interior volume of the housing, and a sensor element disposed within the housing and coupled to the lead wire, wherein the sensor element comprises a sensor head having a first vertex.

In various embodiments, the sensor head further comprises a second vertex and a third vertex, wherein each of the first vertex, the second vertex, and the third vertex are rounded. In various embodiments, each of the first vertex, the second vertex, and the third vertex comprise an interior angle defining a triangular head. In various embodiments, the triangular head is at least one of isosceles, equilateral, scalene, acute, obtuse, or right planform. In various embodiments, the first vertex, the second vertex, and the third vertex define at least one of a unilateral or bilateral curved head comprising at least one of a concave curve, a convex curve, or a compound curve. In various embodiments, the sensor head further comprises a fourth vertex defining a truncated bilateral curved head. In various embodiments, the sensor head further comprises a fourth vertex, each of the first vertex, the second vertex, the third vertex, and the fourth vertex having an interior angle defining a quadrilateral head. In various embodiments, the quadrilateral head is at least one of rectangular, square, rhomboidal, trapezoidal, or frustoconical planform. In various embodiments, the sensor head further comprises a fourth vertex, a fifth vertex, and a sixth vertex defining a cranked arrow head, wherein the fifth vertex and the sixth define an area of relatively increased or decreased X-Z slope along the perimeter of the cranked arrow head between each of their respective adjacent vertexes.

In various embodiments, the present disclosure provides a system for determining the position of a rotating component. The system may receive a first time variant voltage signal. The system may extract a first pulse width and a second pulse width from the time variant voltage signal and determine an axial position of a rotating target based on the variance between the first pulse width and the second pulse width. The system may select a voltage-distance curve based on the first pulse width and the second pulse width. The system may determine a radial position of the rotating target based on the voltage component of the first time voltage signal and the voltage distance curve. In various embodiments, the system may receive a second time variant voltage signal. In various embodiments, the system may determine the axial position of the rotating target based a voltage variance between the first time variant voltage signal and the second time variant voltage signal, wherein the voltage variance with respect to time is relatively steady state for each of the first time variant voltage signal and the second time variant voltage signal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
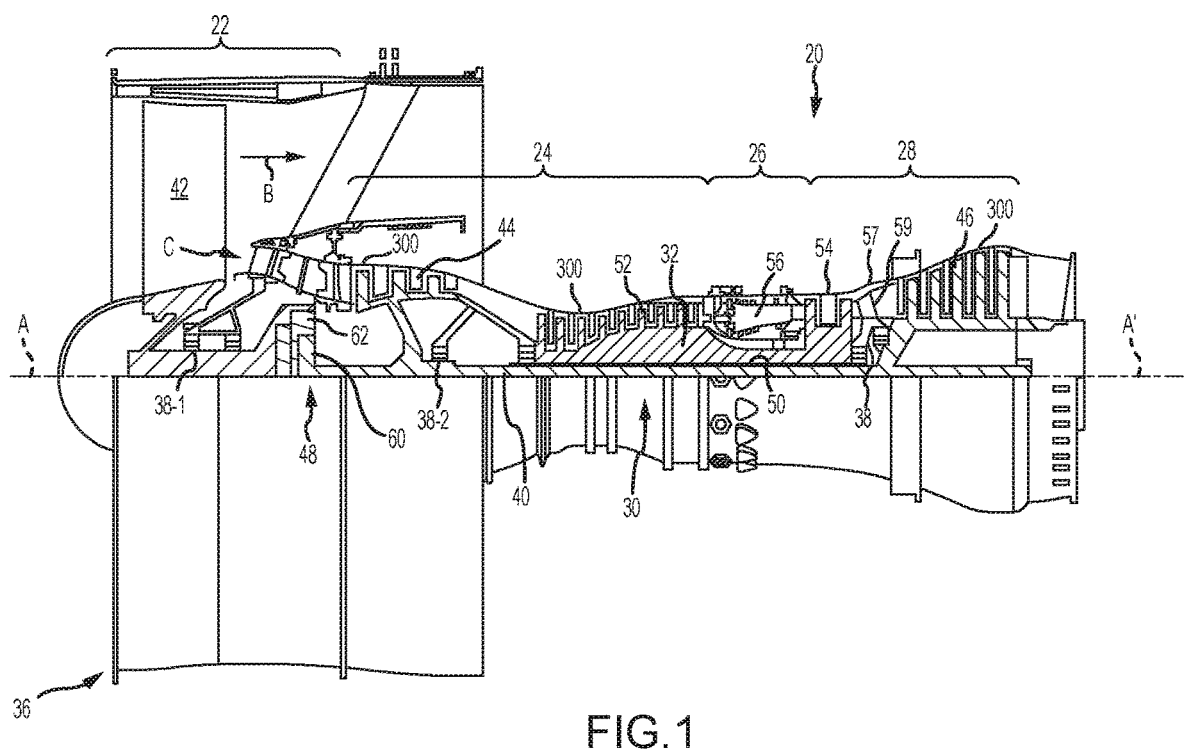
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter). In various embodiments, one or more BTC probes 300 (FIG. 3 described below) may be located radially outward of a compressor blade of compressor section 24, a turbine blade of turbine section 28 and may be embedded, respectively, in a compressor case or a turbine case, or as may be located radially outward of a fan blade as described below with reference to FIG. 2.

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
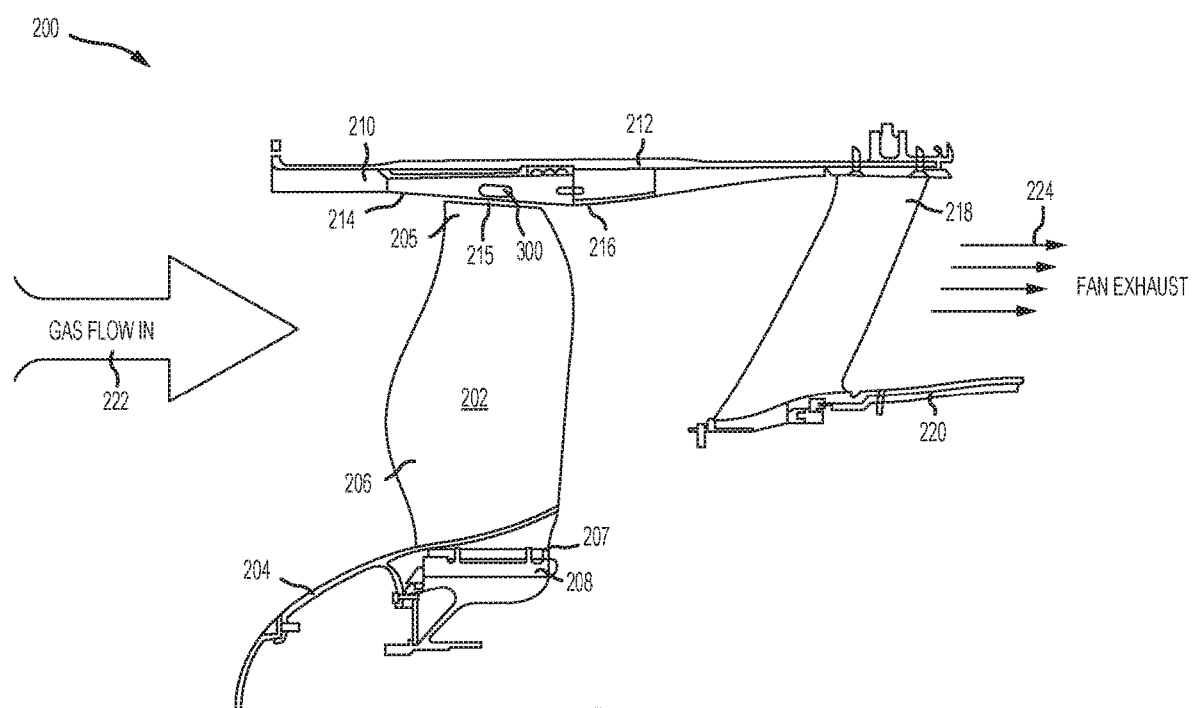
FIG. 2 illustrates a fan section having a low profile triaxial BTC probe, in accordance with various embodiments.

According to various embodiments and with reference to FIGS. 1 and 2, a fan section 200 having a probe 300, is provided. Fan 202 comprises blade 206 coupled at blade root 207 to a fan disk 208 and compressor inlet cone 204. Fan 202 may be coupled to a shaft, such as inner shaft 40, where inner shaft 40 may be in mechanical communication with geared architecture 48, or may be in mechanical communication with the low spool shaft directly. Tip 205 of blade 206 lies proximate rub strip 214 which forms a part of the inner aerodynamic surface 216 of fan case 210. A BTC probe 300 lies radially outward of blade 206 and proximate tip 205 between inner aerodynamic surface 216 and outer casing 212 of fan case 210. In various embodiments, BTC probe 300 comprises a portion of rub strip 214 and may be co-molded in part with rub strip 214 or may be embedded within rub strip 214. Fan case 210 may be coupled at an aft end to pylon 218 which may be coupled to compressor casing 220. As fan 202 rotates about the shaft it tends to draw in gas 222, such as, for example air, at the fore end of fan case 210. Rotating fan 202 tends to accelerate gas 222 along inner aerodynamic surface 216 toward pylon 218 passing between inner aerodynamic surface 216 and compressor casing 220 as fan exhaust 224.

In various embodiments, portion of gas 222 may escape fan 202 by passing over tip 205 through a gap 215 between tip 205 and inner aerodynamic surface 216 tending to decrease efficiency. In various embodiments, the width of gap 215 between tip 205 and inner aerodynamic surface 216 may vary with respect to a position along the chord line of blade 206. The BTC probe 300 may be located axially (relative to the axis of rotation of fan 202, with momentary reference to A-A' in FIG. 1) within a bounded portion of rub strip 214 bounded at the forward end by a leading edge of blade 206 and at the aft end by a trailing edge of blade 206. In various embodiments, a plurality of BTC probes may be located axially within the bounded portion of rub strip 214 along the chord of blade 206. In various embodiments, a plurality of BTC probes may be located circumferentially around fan section 200 within the bounded portion of rub strip 214.

Figure 3:
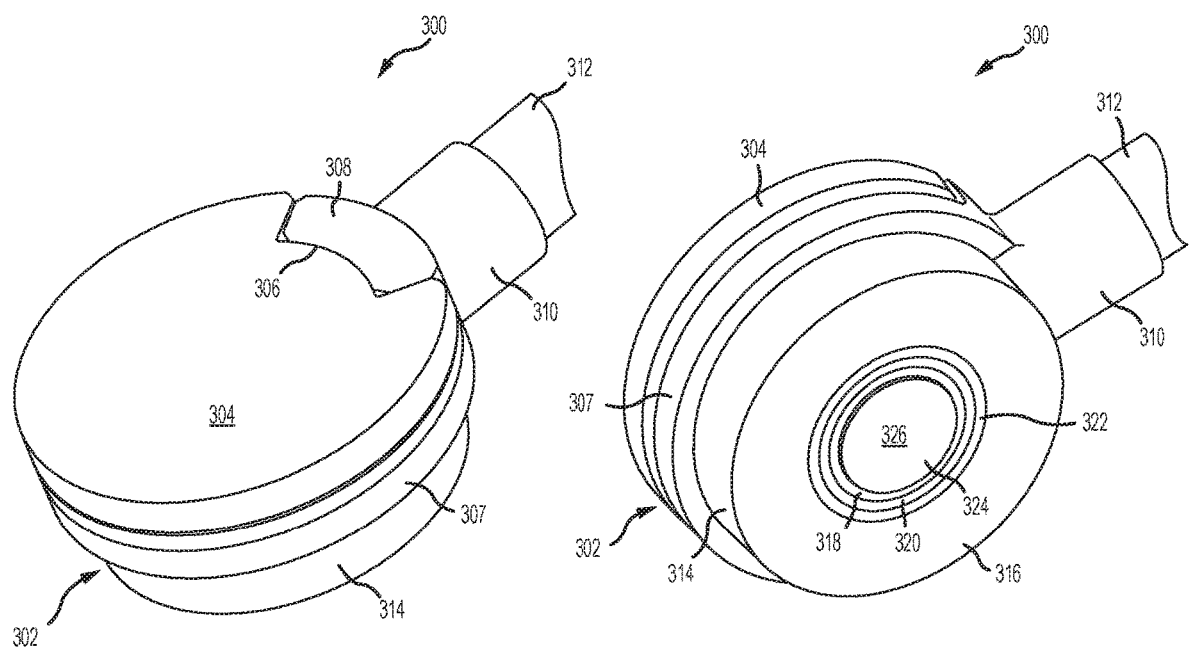
FIG. 3 illustrates a BTC probe, in accordance with various embodiments.

With additional reference to FIG. 3, a BTC probe 300 may comprise a housing 302 and a cap 304 enclosing an interior volume of the housing 302 when coupled at a top surface of a body 407 of the housing 302. In various embodiments, housing 302 may comprise a portion of rub strip 214, or may comprise a portion of a turbine case, or a compressor case. In various embodiments, cap 304 may comprise an alignment feature 306 configured to align with an alignment block 308 of housing 302. In various embodiments, housing 302 may further comprise a body 307 having a top surface and a cylindrical portion 314 extending toward a bottom surface 316. A neck 310 may extend radially from body 307 and alignment block 308 may comprise a portion of neck 310. In various embodiments, a hard lead 312 may be inserted through housing 302 via neck 310. Housing 302 may enclose a sensor element 324. A sensor head 326 of sensor element 324 may extend through bottom surface 316. Sensor element 324 may be surrounded by an inner hat insulator 318, an inner housing 320 and an outer hat insulator 322.

Figure 4:
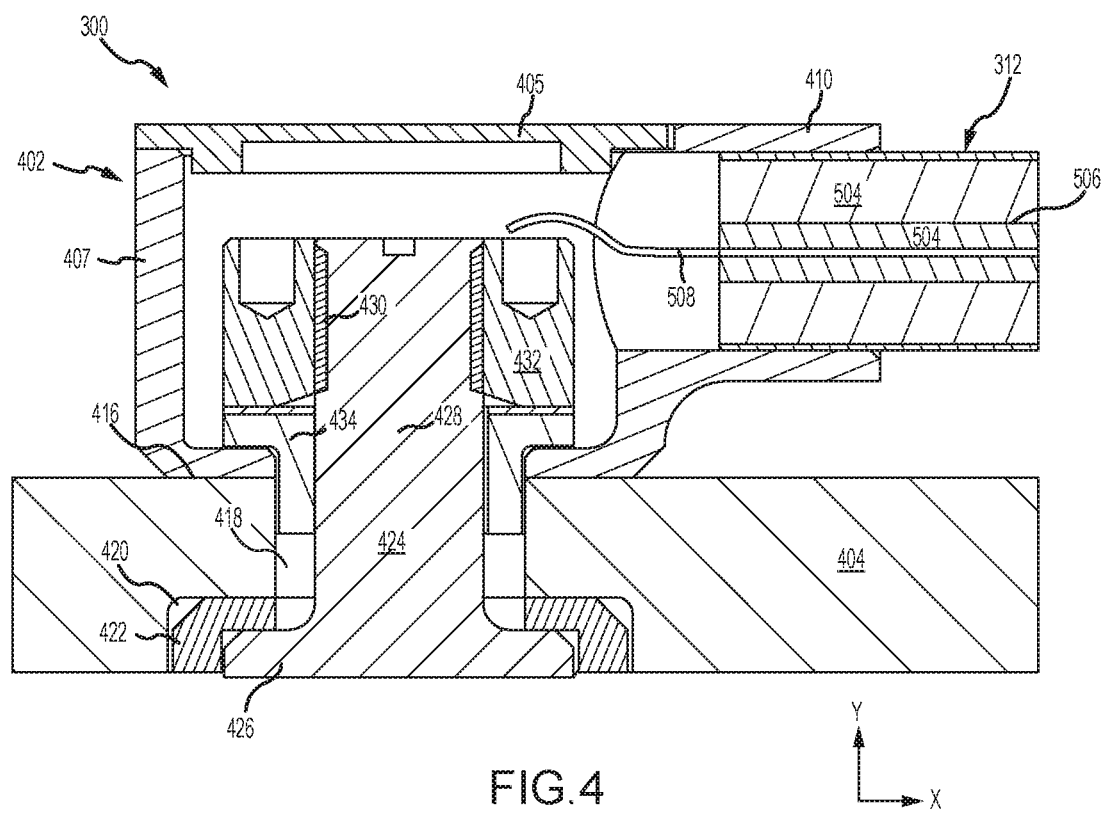
FIG. 4 illustrates a BTC probe, in accordance with various embodiments.
Figure 5:
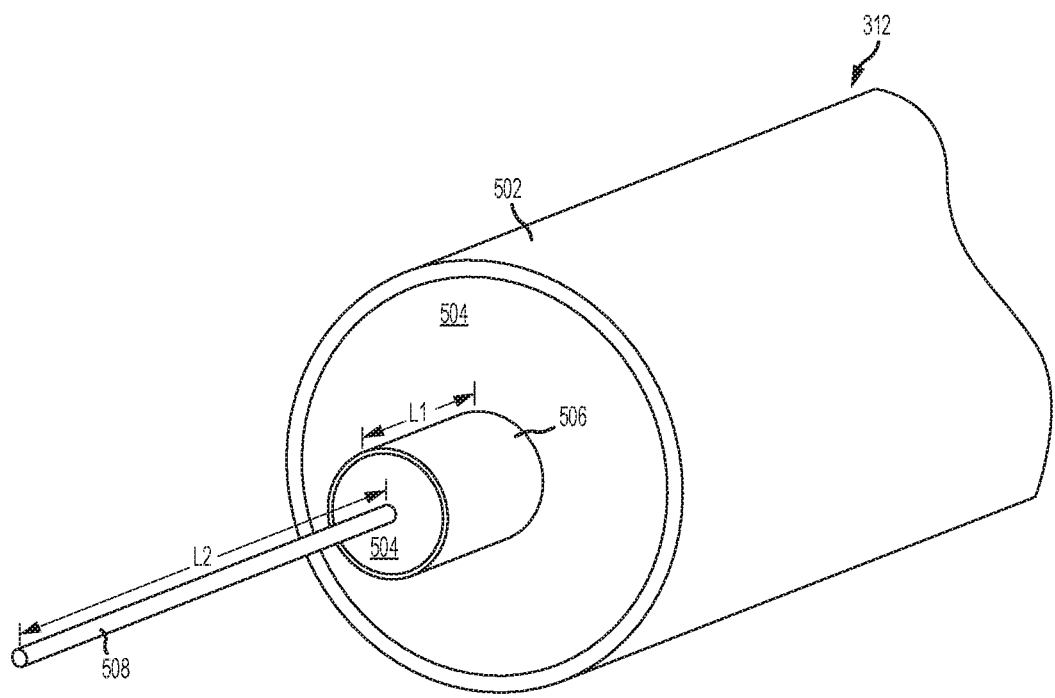
FIG. 5 illustrates a cross section of a hard lead comprising a driven guard, in accordance with various embodiments.
Figure 6A:
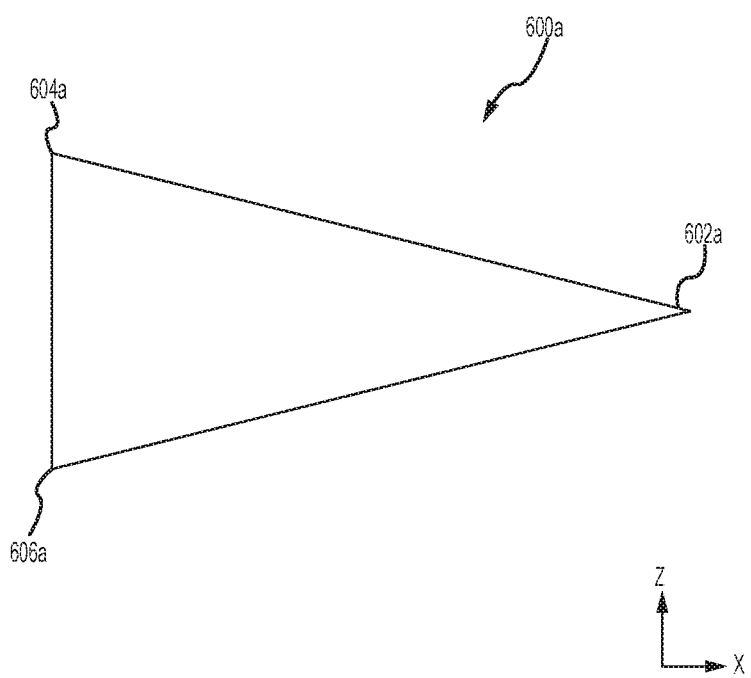
FIG. 6A illustrates a sensor head of a BTC probe, in accordance with various embodiments.
Figure 6B:
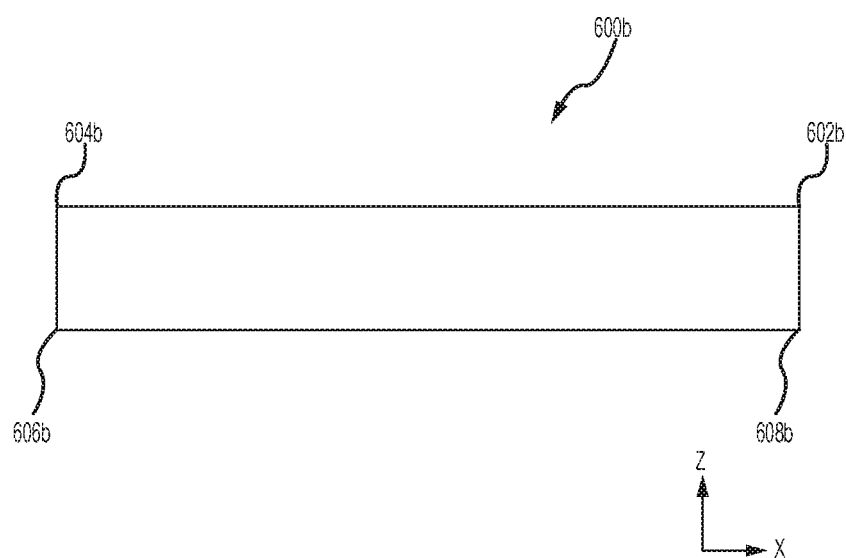
FIG. 6B illustrates a sensor head of a BTC probe, in accordance with various embodiments.
Figure 6C:
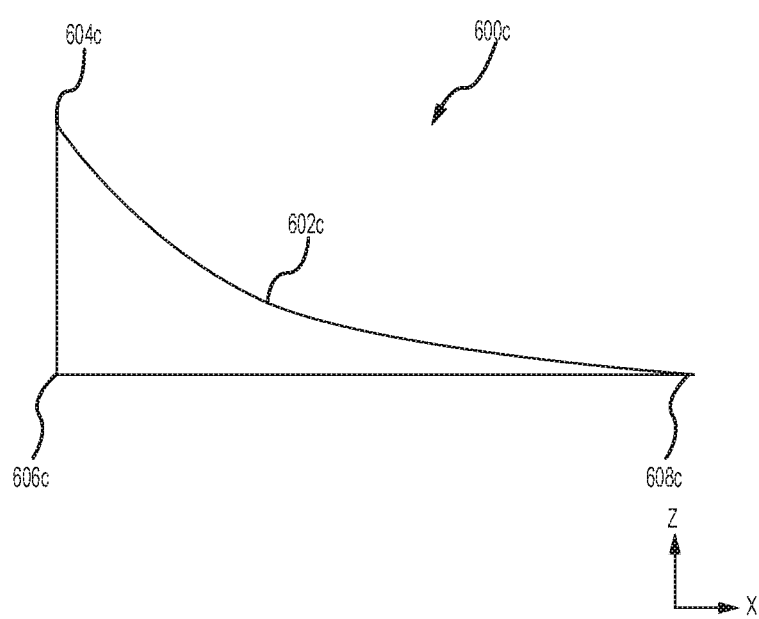
FIG. 6C illustrates a sensor head of a BTC probe, in accordance with various embodiments.
Figure 6D:
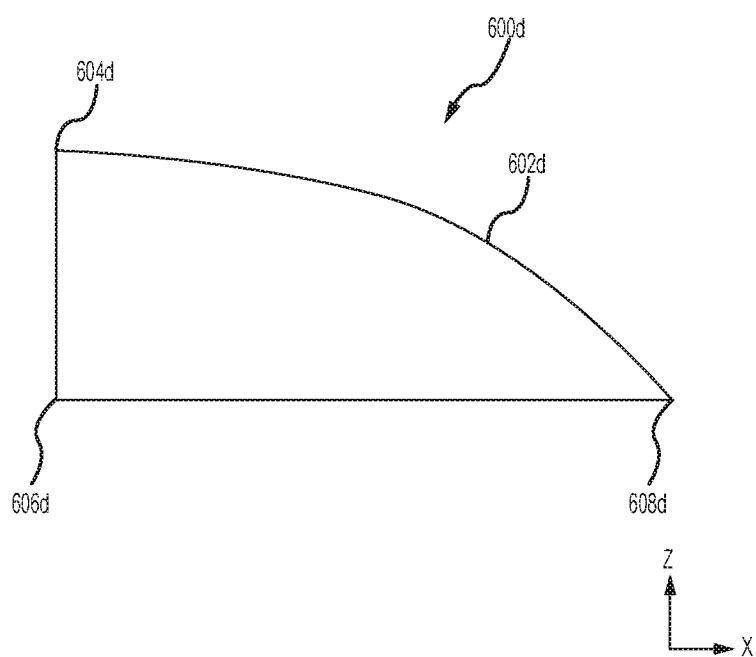
FIG. 6D illustrates a sensor head of a BTC probe, in accordance with various embodiments.
Figure 6E:
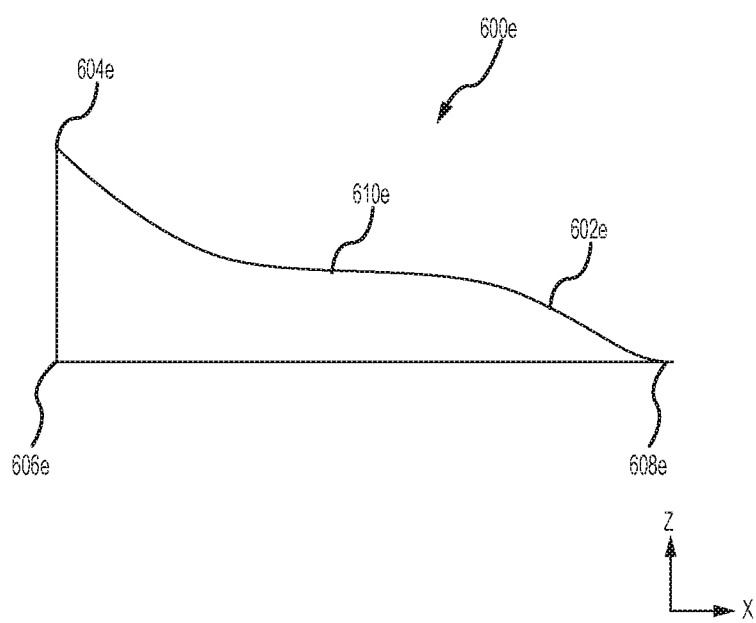
FIG. 6E illustrates a sensor head of a BTC probe, in accordance with various embodiments.
Figure 6F:
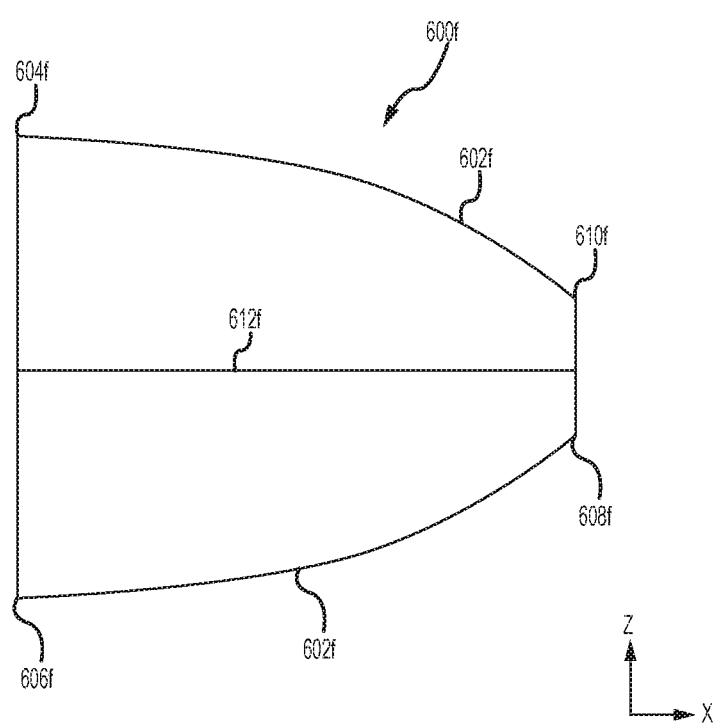
FIG. 6F illustrates a sensor head of a BTC probe, in accordance with various embodiments.
Figure 6G:
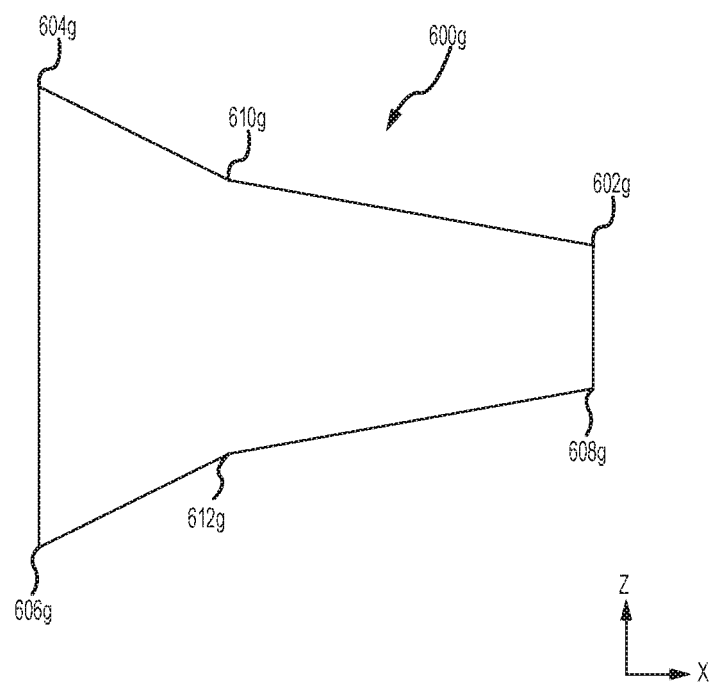
FIG. 6G illustrates a sensor head of a BTC probe, in accordance with various embodiments.

In various embodiments, and with additional reference to FIGS. 4 and 5 a BTC probe 300 may comprise a housing 402 having features, geometries, construction, materials, manufacturing techniques, and/or internal components similar to housing 302. Housing 402 may be mounted radially outward of a structure 404 such as, for example, a turbine case or a compressor case. Housing 402 may comprise a body 407 having neck 410 extending radially from the body 407 configured to accept hard lead 312. Housing 402 may further comprise a cap 405 enclosing an interior volume of the housing 402 when coupled at a top surface of body 407. Body 407 may comprise a bottom surface 416 opposite the top surface and in contact with structure 404. Bottom surface 416 may be positioned proximate bore 418 and counterbore 420 through structure 404. Sensor element 424 may be inserted into bore 418 and counterbore 420 with shank 428 of sensor element 424 extending radially through structure 404 into housing 402. Shank 428 may be coupled at threaded coupling 430 to nut 432 and insulated from contact with body 407 and structure 404 by hat insulator 434. With nut 432 coupled to shank 428 sensor head 426 of sensor element 424 may be drawn to rest within counterbore 429 against counterbore insulator 422. In this regard, sensor element 424 may couple housing 402 to structure 404.

In various embodiments, and with brief reference to FIG. 5, a hard lead such as hard lead 312 may be a driven guard hard lead and comprise a lead wire 508 surrounded by a driven guard 506 containing a first layer of insulating material 504 therein. Driven guard 506 is surrounded by a second layer of insulating material 504 contained within a hard shield 502 such as, for example, a metallic tube such as one of a steel, a stainless steel, an alloy, and/or an aluminum. In various embodiments, a length L1 of driven guard 406 and a length L2 of lead wire 408 are exposed for assembly. Lead wire 408 is coupled to and is in electronic communication with a sensor element, such as sensor element 324 or 424. In various embodiments, hard shield 502 is coupled to and in electronic communication with a housing such as housing 302 or 402. In various embodiments, driven guard 506 may be coupled to and in electronic communication with an interior structure of a housing such as, for example, inner housing 320. In various embodiments, a hard lead such as hard lead 312 may have a diameter about 0.125 in. (3.175 mm) where about in this context means +/−0.015 in. (0.381 mm).

With additional reference to FIGS. 6A through 6G, various head shapes of a sensor head of a sensor element having features, geometries, construction, materials, manufacturing techniques, and/or internal components similar to sensor element 324 and sensor element 424 are illustrated in a radial orientation as viewed toward a bottom surface of a body of a housing such as, for example, housing 302 or housing 402. Triangular head 600a is defined at first vertex 602a, second vertex 604a, and third vertex 606a each having a corresponding interior angle. Triangular head 600a may be defined by first vertex 602a, second vertex 604a, and third vertex 606a to have a desired planform such as, for example, isosceles, equilateral, scalene, acute, obtuse, right, and/or the like. Quadrilateral head 600b is defined at first vertex 602b, second vertex 604b, third vertex 606b, and fourth vertex 608b each having a corresponding interior angle. In this regard, quadrilateral head may define a quadrilateral having a desired planform such as, for example, rectangular, square, rhomboidal, trapezoidal, frustoconical, and/or the like. In various embodiments, a cranked arrow head 600g is defined at first vertex 602g, second vertex 604g, third vertex 606g, and fourth vertex 608g with a fifth vertex 610g and a sixth vertex 612g. The fifth vertex 610g and the sixth vertex 612g may define an area of relatively increased or decreased X-Z slope along the perimeter of the cranked arrow head 600g between each of their respective adjacent vertexes.

In various embodiments, a concave head 600c may comprise a concave curve 602c and may be defined between a first vertex 604c a second vertex 606c and a third vertex 608c. In various embodiments, a convex head 600d may comprise a convex curve 602d and may be defined between a first vertex 604d a second vertex 606d and a third vertex 608d. In various embodiments, a compound curved head 600e may comprise a compound curve 602e and may be defined between a first vertex 604e a second vertex 606e and a third vertex 608e. Compound curve 602e may comprise a local plateau 610e defined by a region of relatively low X-Z slope along the perimeter of the compound curved head where the ratio of change in Z-axis position with respect to X-axis position is less than or equal 1:10. In various embodiments, the local plateau 610e may have a region where the slope is zero.

In various embodiments, curved heads (600c, 600d, and 600e) may be unilateral or bilateral. Stated another way, and with additional reference FIG. 6F, the curve of a curved head may be mirrored about a centerline (i.e., 612f) perpendicular to a line defined between the first vertex (e.g., 604c, 604e, 604f) and the second vertex (e.g., 606c, 606e, 606f). In a similar manner, any of the curves (602c, 602d, 602e) may be offset relative to the Z-axis and/or truncated with respect to the X-axis tending thereby to define a frustum or half-frustum with the third vertex (e.g., 608f) and a fourth vertex (e.g., 610f). In various embodiments, any of the vertexes of the various heads (600a, 600b, 600c, 600d, 600e, 600f, and 600g) may be rounded tending thereby to ease manufacturing and reduce stress concentrations which may develop at hard corners.

With renewed reference again to FIGS. 2 through 5, a sensor element of BTC probe 300, such as sensor element 324 or sensor element 424, may be energized by lead wire 508 and an electric field flows between the sensor element a ground plane such as, for example, structure. As a blade tip, such as tip 205 of blade 206, passes proximate to sensor element 324, an electric field tends to flow across gap 215 into the blade tip inducing a capacitance between the blade tip and the sensor element 324 which tends to vary with respect to the width of gap 215. In this regard, the gap between a non-continuous target (e.g., a blade tip of a turbine blade) and a sensor head may be determined as a function of the change in capacitance occurring at a frequency which is a function of the time the blade tip dwells within the electric field. In a similar manner, a BTC probe 300 may be used to measure a gap between a probe head and other rotating components of gas turbine engine 20 which may be continuous or nearly continuous targets such as, for example, a knife edge seal.

Figure 7:
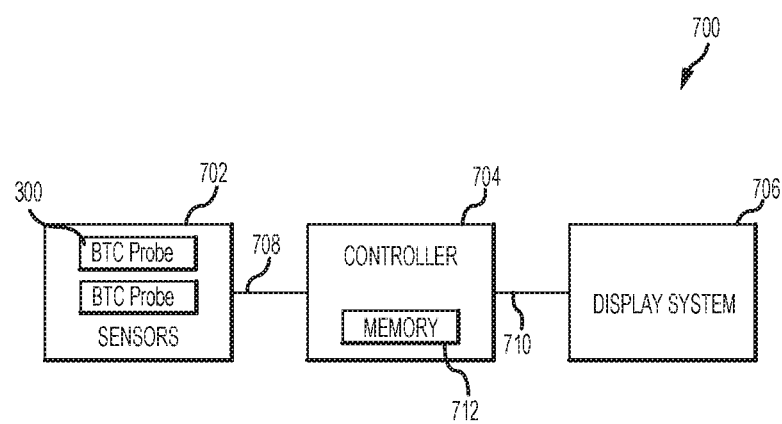
FIG. 7 illustrates a system for measuring axial shift and radial gap of rotating components, in accordance with various embodiments.
Figure 8:
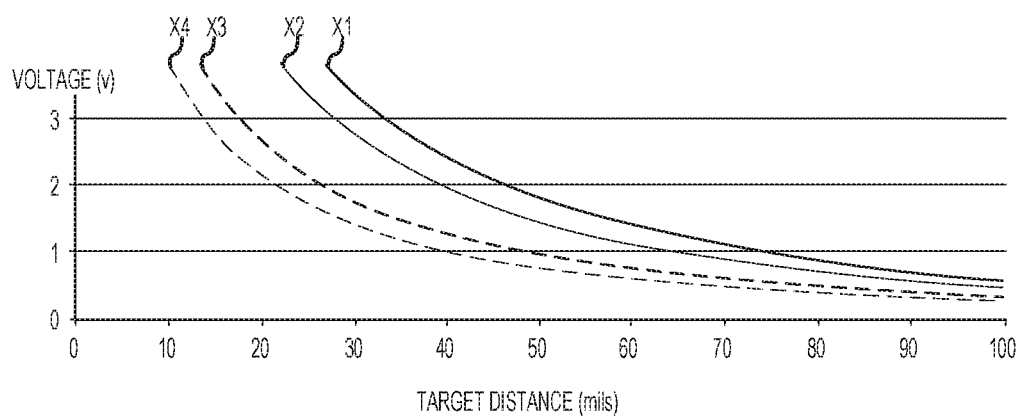
FIG. 8 illustrates voltage-distance curves, in accordance with various embodiments.

In various embodiments and with additional reference to FIG. 7, a schematic diagram of a system 700 for measuring axial shift and radial gap of rotating components of gas turbine engines, such as gas turbine engine 20, is illustrated. System 700 may comprise sensors 702, controller 704, and a display system 706. Sensors 702 may be in electronic communication with controller 704 and comprise one or more BTC probes 300. Sensors 702 may output sensor data 708 to controller 704. In various embodiments, sensor data 708 may comprise a time varying signal with respect to a voltage (i.e., a time variant voltage signal). As discussed above with regard to capacitance between the blade tip and the sensor element, the peak voltage of the time variant voltage signal may be a function of the distance between the target (e.g., a blade tip) and the sensor. In various embodiments, the voltage signal function for a target distance (e.g., a gap such as gap 215) may vary dependent upon target axial position as shown in FIG. 8. FIG. 8 illustrates four voltage-distance curves X1, X2, X3, and X4 each correlated to an axial position (for example a position along axis A-A' of gas turbine engine 20) of a target such as, for example, a blade tip or knife edge seal.

In various embodiments, the a sensor head of the BTC probe 300 may be configured as described with reference to FIGS. 6A-6G above to generate a desired position (axial or radial) variant response (i.e., variant with respect to the position of a target) in the time varying signal of sensor data 708. In various embodiments, sensors 702 may comprise a first BTC sensor configured to generate an axial position variant response in the time varying signal. In this regard, and in a similar fashion to the various voltage-distance curves, a pulse width of the time variant voltage signal may vary with respect to axial position as shown in FIG. 9A.

Figure 9A:
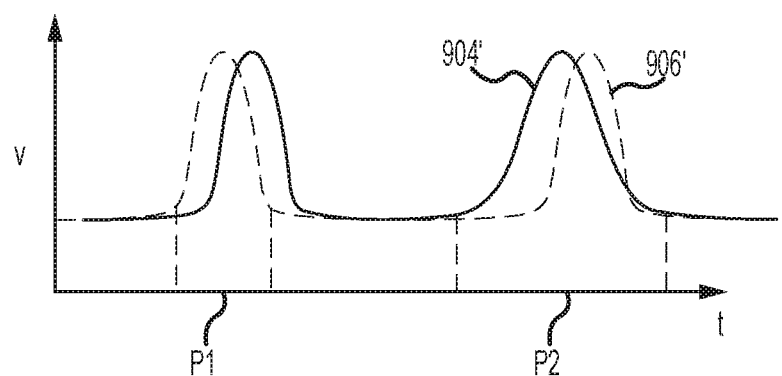
FIG. 9A illustrates an axial shift of a blade tip in relation to a sensor output, in accordance with various embodiments.
Figure 9A:
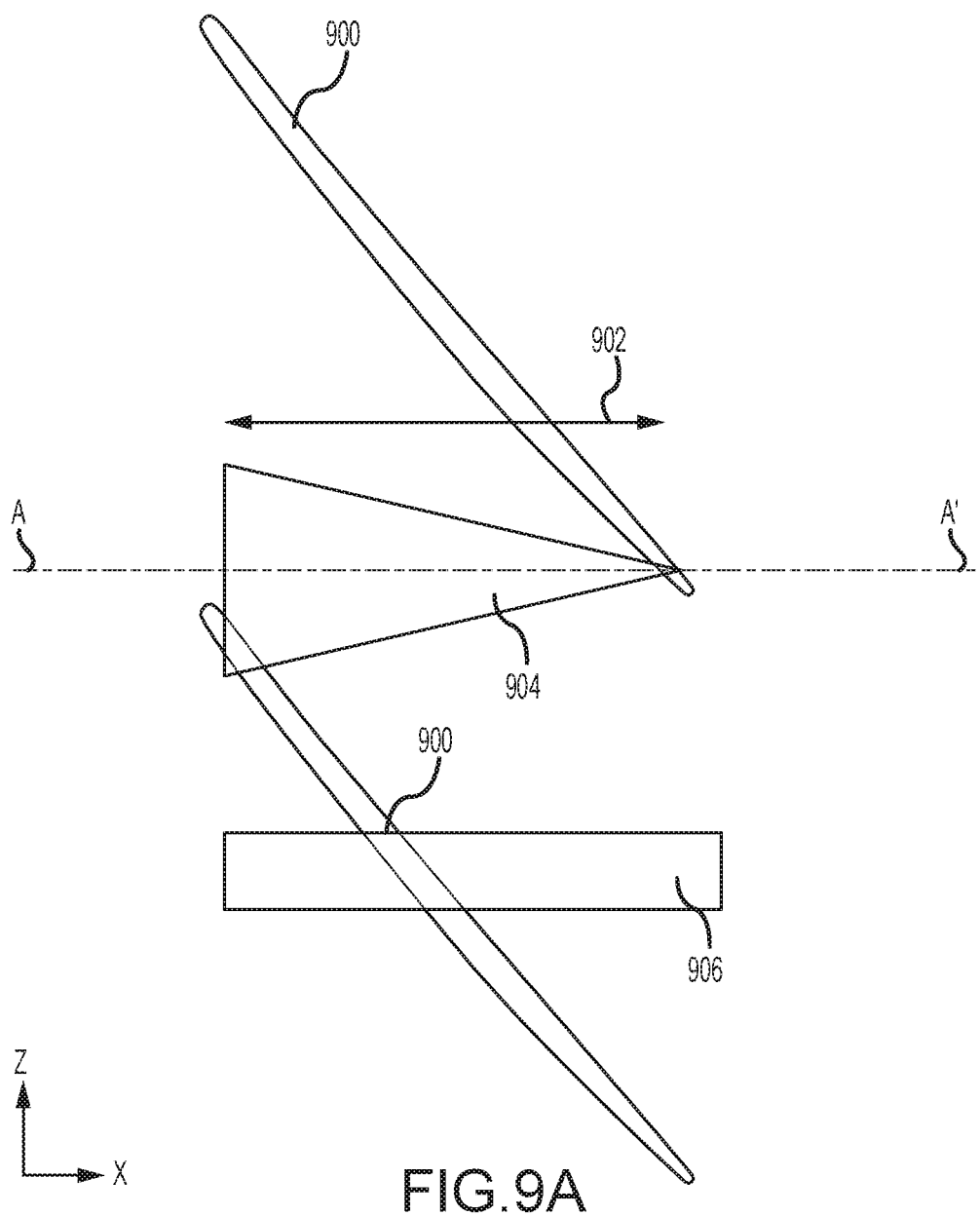

FIG. 9A illustrates the path of blade tips 900 over a triangular head 904 of a first BTC sensor and a rectangular quadrilateral head 906 of a second BTC sensor. Blade tips 900 may shift axially (X-axis) with respect to triangular head 904 as indicated by arrow 902 along the axis of rotation A-A' of a gas turbine engine. In response, the pulse width P of a first time variant voltage signal 904' from the first BTC sensor may change from a first pulse width P1 to a second pulse width P2. In comparison, shifting blade tips 900 as indicated by arrow 902 with respect to rectangular quadrilateral head 906 produces a steady state response in the pulse width P of a second time variant voltage signal 906' from the second BTC sensor. In this regard, controller 704 may determine an axial position of a rotating target such as blade tips 900 based on the variance between the first pulse width P1 and the second pulse width P2. In various embodiments, P1 may be correlated with a first voltage-distance curve (e.g., X1) and P2 may be correlated with a second voltage-distance curve (e.g., X2). In this regard, a radial distance between the first BTC sensor and the target such as blade tips 900 may be determined based on a voltage distance curve calibrated to the axial position of the target.

Figure 9B:
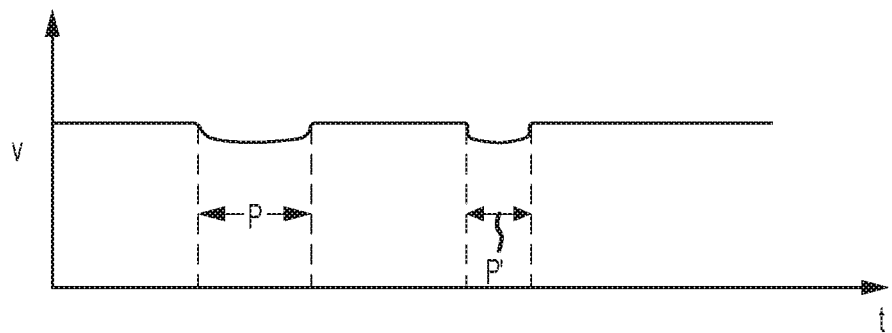
FIG. 9B illustrates an axial shift of a rotating seal in relation to a sensor output, in accordance with various embodiments.
Figure 9B:
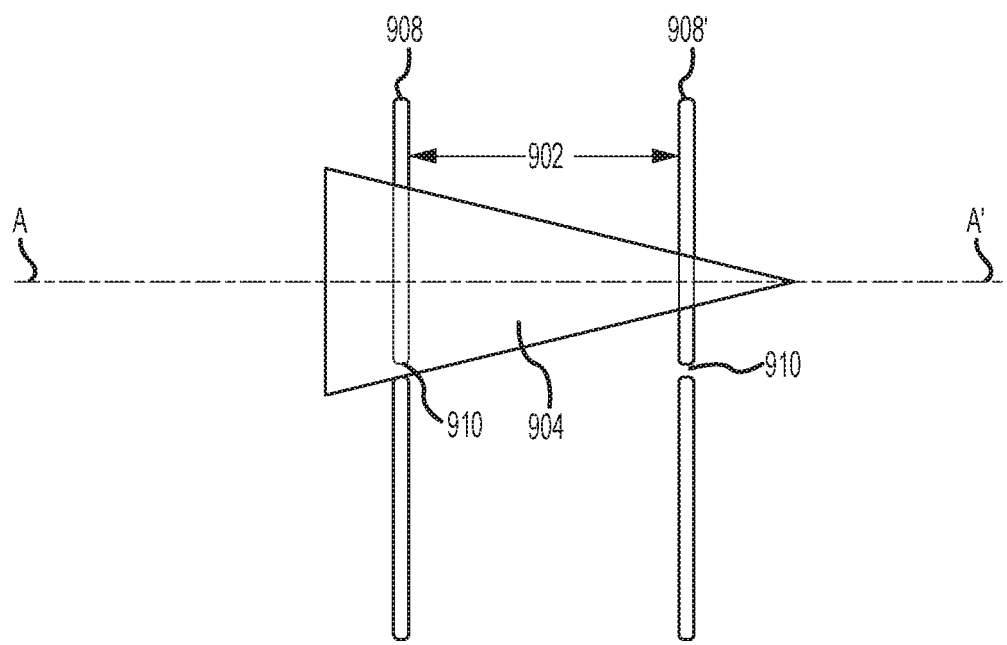
Figure 9C:
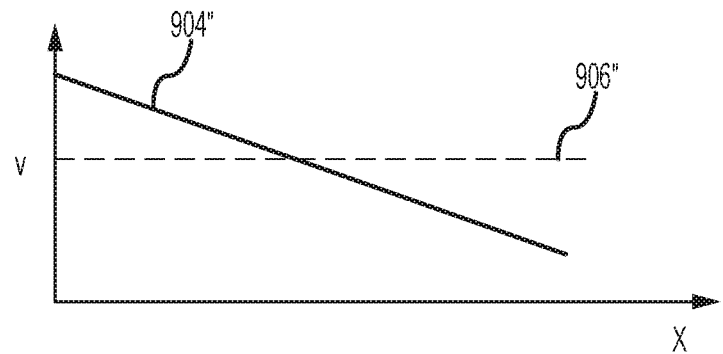
FIG. 9C illustrates an axial shift of a rotating seal in relation to a sensor output, in accordance with various embodiments.
Figure 9C:
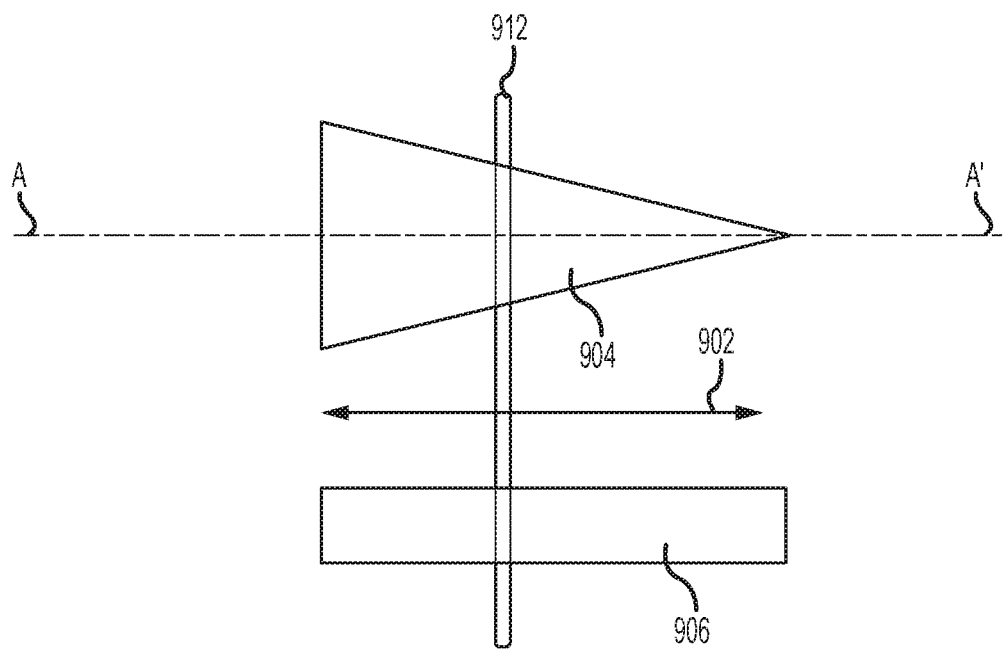
Figure 9C:
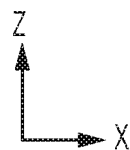

In like regard and in various embodiments as illustrated by FIG. 9B, controller 704 may determine an axial position of a rotating target such as knife edge seal 908. Knife edge seal may shift axially along axis of rotation A-A' of a gas turbine with respect to triangular head 904 to a position 908'. Knife edge seal 908 may comprise a small gap 910. In response the pulse width from the first BTC sensor may change from a first pulse width P to a second pulse width P' as marked between dropouts produced by gap 910 from a relatively steady state voltage. In various embodiments, the steady state voltage may between about 1 volt to about 100 millivolts where about in this context means ±50 millivolts. Relatedly, and with reference to FIG. 9C, controller 704 may determine an axial position of a rotating target such as knife edge seal 912 which may be a continuous target. As knife edge seal 912 shifts axially as indicated by arrow 902, voltage variance with respect to time may be relatively steady state. However, in response to an axial shift in the knife edge seal 912 the first BTC sensor may generate a position variant voltage signal 904″ while the second BTC sensor may generate a relatively steady state voltage signal 906″. In this regard, controller 704 may determine the axial shift of the knife edge seal 912 as a function of the position variant voltage signal and the stead state voltage signal. In various embodiments, controller 704 may determine a target background error correction based on the steady state voltage signal.

In various embodiments, display system 706 may be in electronic communication with controller 704 and receive position data 710 from controller 704. Display system 706 may comprise hardware and/or software configured to display position data 710. In various embodiments, the position data 710 may comprise engineering units describing an axial shift (along the X-axis, i.e. the axis of rotation of gas turbine engine 20) of a rotating component with respect to the position of a sensor. In various embodiments, the position data 710 may comprise engineering units describing a radial gap between the rotating component and the sensor.

Any of the system 700 components may be in communication with controller 704 via a network. System 400 may be computer based, and may comprise a processor, a tangible non-transitory computer-readable memory, and/or a network interface, along with other suitable system software and hardware components. In various embodiments, controller 704 may be implemented in a single processor or one or more processors configured to implement various logical operations in response to execution of instructions, for example, instructions stored on a non-transitory, tangible, computer-readable medium such as, for example, memory 712 which may store data used, for example, for trending and analysis/prognosis purposes. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof. In various embodiments, controller 704 may be configured as a central network element or hub to access various systems, engines, and components of system 700. In various embodiments, controller 704 may comprise a network, computer-based system, and/or software components configured to provide an access point to various systems, engines, and components of system 700.

Figure 10:
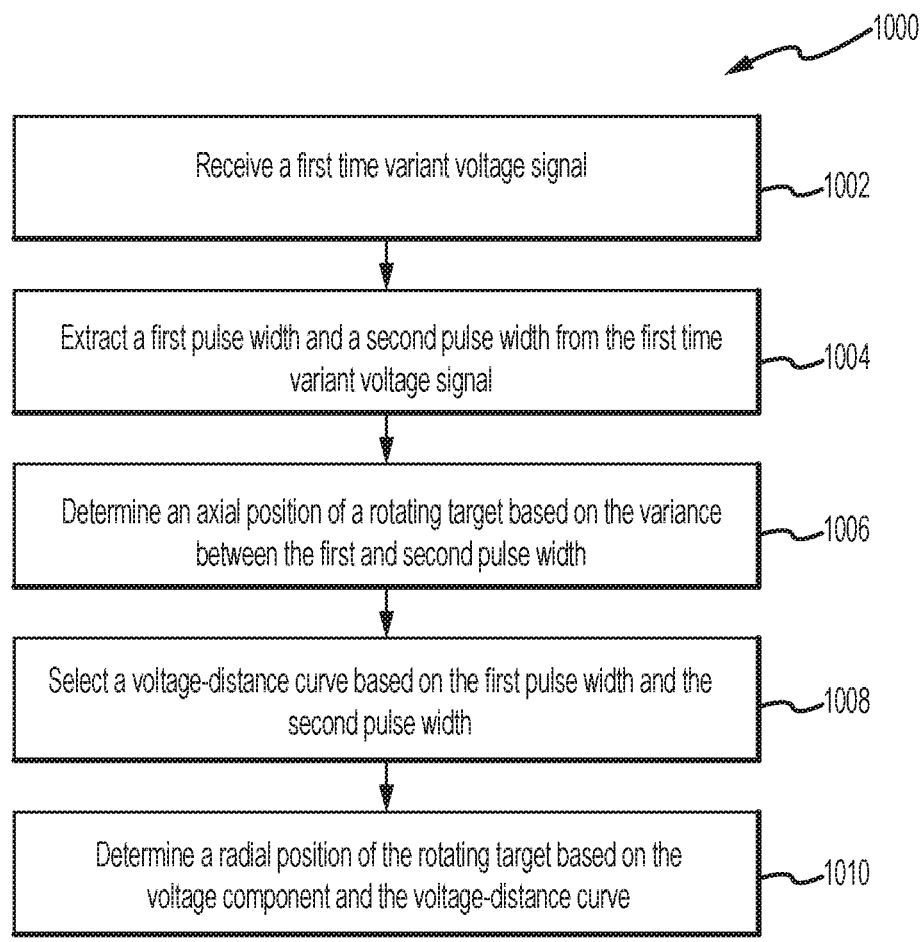
FIG. 10 illustrates a method of determining the position of a rotating component, in accordance with various embodiments.

In various embodiments and with reference now to FIG. 10, a method 1000 of determining the position of a rotating component may comprise controller 704 receiving sensor data 708 comprising a first time variant voltage signal (step 1002) from BTC probe 300. Controller 704 may extract a first pulse width and a second pulse width from the sensor data 708 (step 1004). Controller 704 may determine an axial position of a rotating target (such as, for example, blade tips 900, knife edge seal 908, or knife edge seal 912) based on the variance between the first pulse width and the second pulse width (step 1006). Controller 704 may select a voltage-distance curve based on the first pulse width and the second pulse width (step 1008). Controller 704 may determine a radial position of the rotating target based on the voltage component of the first time voltage signal and the voltage distance curve (step 1010). In various embodiments, controller 704 may receive a second a second time variant voltage signal. In various embodiments, controller 704 may determine the axial position of the rotating target based a voltage variance between the first time variant voltage signal and the second time variant voltage signal, wherein the voltage variance with respect to time is relatively steady state for each of the first time variant voltage signal and the second time variant voltage signal.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A blade tip clearance (BTC) probe, comprising:
a housing having a body, a neck extending radially from the body coupled to a hard lead comprising a hard shield, a driven guard, and a lead wire, and a cap coupled at a top surface of the body enclosing an interior volume of the housing; and a sensor element disposed within the housing and coupled to the lead wire, wherein the sensor element comprises a sensor head having a first vertex, a second vertex, and a third vertex, wherein each of the first vertex, the second vertex, and the third vertex are rounded, wherein the first vertex, the second vertex, and the third vertex define at least one of a first sensor head geometry, a second sensor head geometry, a third sensor head geometry, or a fourth sensor head geometry, wherein the first sensor head geometry is a unilateral or bilateral curved head comprising at least one of a concave curve, a convex curve, or a compound curve, wherein the second sensor head geometry includes a fourth vertex, each of the first vertex, the second vertex, the third vertex, and the fourth vertex having an interior angle defining a quadrilateral head, wherein the third sensor head geometry further comprises the fourth vertex, a fifth vertex, and a sixth vertex defining a cranked arrow head, wherein the fifth vertex and the sixth define an area of relatively increased or decreased X-Z slope along a perimeter of the cranked arrow head between each of their respective adjacent vertexes, and wherein the fourth sensor head geometry comprises each of the first vertex, the second vertex, and the third vertex having an interior angle defining a triangular head.

2. The BTC probe of claim 1, wherein the triangular head is at least one of isosceles, equilateral, scalene, acute, obtuse, or right planform.

3. The BTC probe of claim 1, wherein the first sensor head geometry further comprises the fourth vertex defining a truncated bilateral curved head.

4. The BTC probe of claim 1, wherein the quadrilateral head is at least one of rectangular, square, rhomboidal, trapezoidal, or frustoconical planform.

5. A gas turbine engine comprising:
a fan section having a fan case;
a compressor section having a compressor case;
a turbine section having a turbine case; and
a blade tip clearance (BTC) probe, comprising:
a housing having a body, a neck extending radially from the body coupled to a hard lead comprising a hard shield, a driven guard, and a lead wire, and a cap coupled at a top surface of the body enclosing an interior volume of the housing; and
a sensor element disposed within the housing and coupled to the lead wire,
wherein the sensor element comprises a sensor head having a first vertex, a second vertex and a third vertex,
wherein each of the first vertex, the second vertex, and the third vertex are rounded
wherein the first vertex, the second vertex, and the third vertex define at least one of a first sensor head geometry, a second sensor head geometry, a third sensor head geometry, or a fourth sensor head geometry,
wherein the first sensor head geometry is a unilateral or bilateral curved head comprising at least one of a concave curve, a convex curve, or a compound curve,
wherein the second sensor head geometry includes a fourth vertex, each of the first vertex, the second vertex, the third vertex, and the fourth vertex having an interior angle defining a quadrilateral head,
wherein the third sensor head geometry further comprises the fourth vertex, a fifth vertex, and a sixth vertex defining a cranked arrow head, wherein the fifth vertex and the sixth define an area of relatively increased or decreased X-Z slope along a perimeter of the cranked arrow head between each of their respective adjacent vertexes, and
wherein the fourth sensor head geometry comprises each of the first vertex, the second vertex, and the third vertex having an interior angle defining a triangular head.

6. The gas turbine engine of claim 5, wherein the triangular head is at least one of isosceles, equilateral, scalene, acute, obtuse, or right planform.

7. The gas turbine engine of claim 5, wherein the first sensor head geometry further comprises the fourth vertex defining a truncated bilateral curved head.

8. The gas turbine engine of claim 5, wherein the quadrilateral head is at least one of rectangular, square, rhomboidal, trapezoidal, or frustoconical planform.

9. A system comprising:
a processor; and
a tangible, non-transitory memory configured to communicate with the processor,
the tangible, non-transitory memory having instructions stored thereon that, in response to execution by the processor, cause the processor to perform operations comprising:
receiving, by the processor, a first time variant voltage signal;
extracting, by the processor, a first pulse width and a second pulse width from the time variant voltage signal;
determining, by the processor, an axial position of a rotating target based on the variance between the first pulse width and the second pulse width;
selecting, by the processor, a voltage-distance curve based on the first pulse width and the second pulse width; and
determining, by the processor, a radial position of the rotating target based on the voltage component of the first time voltage signal and the voltage distance curve.

10. The system of claim 9, wherein the operations further comprise:
receiving, by the processor, a second time variant voltage signal;
determining, by the processor, the axial position of the rotating target based a voltage variance between the first time variant voltage signal and the second time variant voltage signal, wherein the voltage variance with respect to time is relatively steady state for each of the first time variant voltage signal and the second time variant voltage signal.

* * * * *